US011199250B2

(12) United States Patent
Podschwadt et al.

(10) Patent No.: US 11,199,250 B2
(45) Date of Patent: Dec. 14, 2021

(54) HYBRID MODULE

(71) Applicant: Schaeffler Technologies AG & Co. KG, Herzogenaurach (DE)

(72) Inventors: Maximilian Podschwadt, Seewald (DE); Markus Steinberger, Sagamore Hills, OH (US); Matthew Payne, Glenmont, OH (US); John Ramsey, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/569,824

(22) Filed: Sep. 13, 2019

(65) Prior Publication Data

US 2020/0094668 A1 Mar. 26, 2020

Related U.S. Application Data

(60) Provisional application No. 62/736,240, filed on Sep. 25, 2018.

(51) Int. Cl.
*F16H 41/24* (2006.01)
*F16H 45/02* (2006.01)
*B60K 6/387* (2007.10)

(52) U.S. Cl.
CPC ............ *F16H 41/24* (2013.01); *B60K 6/387* (2013.01); *F16H 45/02* (2013.01); *F16H 2041/243* (2013.01)

(58) Field of Classification Search
None
See application file for complete search history.

(56) References Cited

U.S. PATENT DOCUMENTS

| | | | | |
|---|---|---|---|---|
| 9,447,864 | B2* | 9/2016 | Iwase | F16H 57/045 |
| 2009/0054203 | A1* | 2/2009 | Heeke | B60K 6/40 |
| | | | | 477/15 |
| 2013/0192947 | A1* | 8/2013 | Frait | B60K 6/48 |
| | | | | 192/3.32 |
| 2014/0094341 | A1* | 4/2014 | Ruder | B60K 6/383 |
| | | | | 477/5 |
| 2015/0000262 | A1* | 1/2015 | Iwase | B60K 6/405 |
| | | | | 60/330 |
| 2016/0084363 | A1* | 3/2016 | Steinberger | B60K 6/38 |
| | | | | 192/3.28 |
| 2016/0105060 | A1* | 4/2016 | Lindemann | H02K 1/27 |
| | | | | 701/22 |
| 2018/0058559 | A1 | 3/2018 | Pyers et al. | |
| 2018/0245640 | A1* | 8/2018 | Lorenz | B60K 6/387 |
| 2021/0126498 | A1* | 4/2021 | Gro Pietsch | H02K 9/19 |

* cited by examiner

*Primary Examiner* — Timothy Hannon

(57) ABSTRACT

A hybrid module for a vehicle includes a torque converter and an electric motor. The torque converter includes an impeller shell and a cover. The cover is fixed to the impeller shell to form at least a portion of an outer shell for the torque converter. The electric motor includes a rotor supported on a rotor carrier. The cover and the rotor carrier are integrally formed from a same piece of material. In an example embodiment, the hybrid module includes a resolver rotor fixed to the rotor carrier. In some example embodiments, the hybrid module includes a cover disk, fixed to the rotor carrier and extending radially inward to form a portion of the outer shell.

18 Claims, 4 Drawing Sheets

HYBRID MODULE

TECHNICAL FIELD

The present disclosure relates generally to a hybrid module, and more specifically to a hybrid module with a lockup clutch and a K0 clutch.

BACKGROUND

Hybrid modules are known. One example is shown in commonly assigned United States Patent Publication No. 2018/0058559 titled ROTOR CARRIER ASSEMBLY to Pyers et al.

SUMMARY

Example embodiments broadly comprise a hybrid module for a vehicle including a torque converter and an electric motor. The torque converter includes an impeller shell and a cover. The cover is fixed to the impeller shell to form at least a portion of an outer shell for the torque converter. The electric motor includes a rotor supported on a rotor carrier. The cover and the rotor carrier are integrally formed from a same piece of material. In an example embodiment, the hybrid module includes a resolver rotor fixed to the rotor carrier. In some example embodiments, the hybrid module includes a cover disk, fixed to the rotor carrier and extending radially inward to form a portion of the outer shell.

In some example embodiments, the hybrid module includes a turbine shell, a turbine hub, a first clutch plate, and a second clutch plate. The turbine shell is arranged with the impeller shell to form a hydrodynamic coupling. The turbine hub is fixed to the turbine shell and includes a first axial tab. The first clutch plate is drivingly engaged with the first axial tab. The cover disk includes a second axial tab and the second clutch plate is drivingly engaged with the second axial tab. In an example embodiment, the turbine hub includes a radial tab and axial displacement of the turbine shell towards the cover disk is limited by the radial tab.

In some example embodiments, the hybrid module includes a first piston and a second piston. The first piston is disposed on a first axial side of the cover disk. The second piston is disposed on a second axial side, opposite the first axial side, of the cover disk. Each of the first piston and the second piston is rotationally fixed and axially displaceable relative to the cover disk. in an example embodiment, the first piston is sealed directly to the cover disk. In some example embodiments, the hybrid module includes a first apply chamber and a second apply chamber. The first apply chamber is at least partially formed by the first piston and the cover disk. The second apply chamber is at least partially formed by the second piston and the cover disk. In an example embodiment, the first apply chamber is arranged for hydraulic connection with an apply channel of an input shaft for a vehicle transmission. In some example embodiments, the hybrid module includes a module housing. The module housing has a radial wall with a first flow channel and the second apply chamber is hydraulically connected to the first flow channel. In an example embodiment, the hybrid module includes an engine shaft with a second flow channel. The second apply chamber is hydraulically connected to the first flow channel by the second flow channel.

In some example embodiments, the hybrid module includes a centering disk, a balance plate, and an engine shaft. The centering disk is rotationally fixed to the rotor carrier. The balance plate is disposed axially between the centering disk and the second piston. The engine shaft is arranged for driving engagement with a vehicle combustion engine. The balance plate and the second piston are each sealed to the rotor carrier and the engine shaft. In some example embodiments, the balance plate includes an axial protrusion in contact with the second piston. In an example embodiment, the hybrid module includes a clutch plate. The axial protrusion is a tab and the clutch plate is drivingly engaged with the tab. In an example embodiment, the hybrid module includes a backing plate fixed to the rotor carrier. The axial protrusion is a tab drivingly engaged with the backing plate.

In some example embodiments, the hybrid module includes a centering disk, a module housing, and a centering bearing. The centering disk is fixed to the rotor carrier and includes a first tubular protrusion. The module housing includes a radial wall and a second tubular protrusion. The centering bearing is disposed radially between the first tubular protrusion and the second tubular protrusion for radially positioning the rotor in the module housing. In an example embodiment, the hybrid module includes a resolver rotor fixed to the second tubular protrusion. In an example embodiment, the module housing includes an outer housing arranged for fixing to a vehicle combustion engine and vehicle transmission. The radial wall and the outer housing are integrally formed from a same piece of material, or the radial wall is a sheet metal part fixed to the outer housing. In an example embodiment, the hybrid module includes a deflector disk fixed to the centering disk and extending radially inward. Other example embodiments broadly comprise a hybrid module with an electric motor, a torque converter, and a K0 clutch. The electric motor includes a rotor and a stator. The torque converter is fixed to the rotor. The torque converter includes a hydrodynamic circuit and a lockup clutch for bypassing the hydrodynamic circuit. The K0 clutch is arranged for selectively connecting the torque converter to a combustion engine. A radially outer diameter of the lockup clutch and the K0 clutch is less than a radially inner diameter of the rotor. In an example embodiment, the rotor includes a first axial end and a second axial end and the K0 clutch is entirely axially between the first axial end and the second axial end. In an example embodiment, the rotor includes a first axial end and a second axial end and the lockup clutch is at least partially axially between the first axial end and the second axial end. In some example embodiments, the torque converter includes a radial wall disposed axially between the lockup clutch and the K0 clutch. In an example embodiment, at least one of the lockup clutch or the K0 clutch includes an axially displaceable piston that is rotationally fixed to the radial wall. In an example embodiment, the lockup clutch includes an axially displaceable piston that is rotationally fixed to the radial wall, and the axially displaceable piston moves away from the radial wall to engage the lockup clutch. In an example embodiment, the K0 clutch includes an axially displaceable piston that is rotationally fixed to the radial wall, and the axially displaceable piston moves away from the radial wall to engage the K0 clutch.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
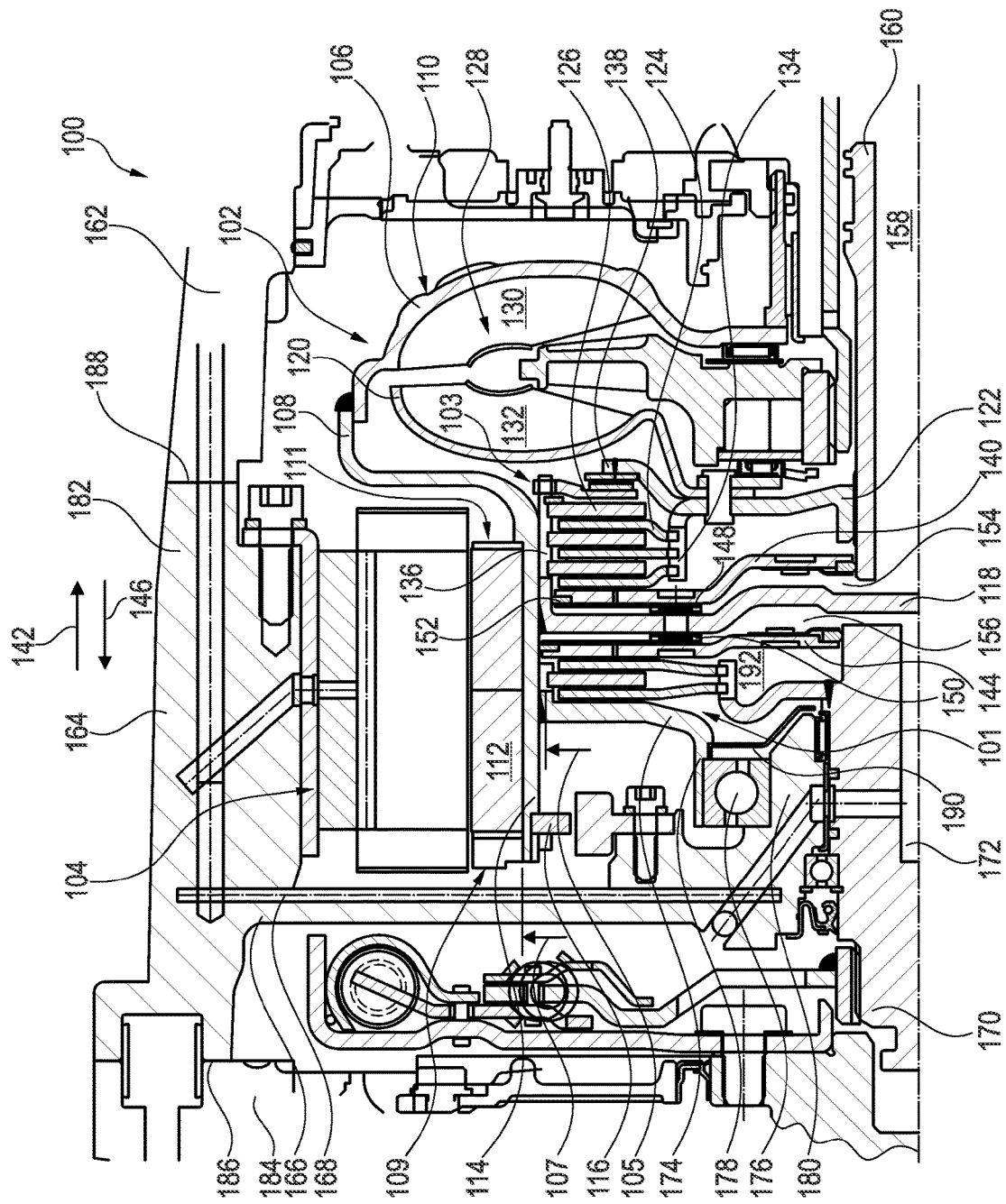
FIG. 1 is a top half cross-sectional view of a hybrid module according to an example embodiment.
Figure 2:
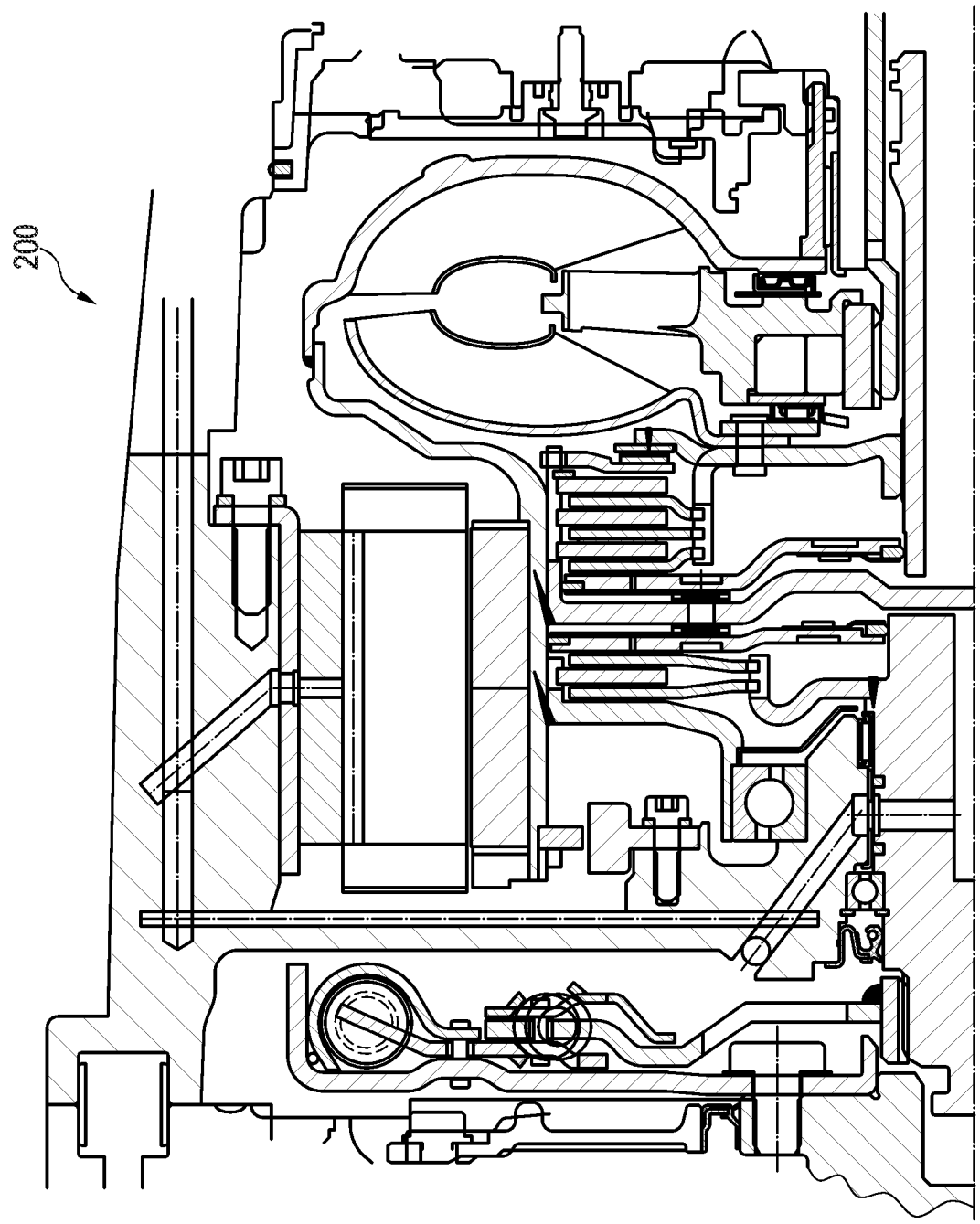
FIG. 2 is a top half cross-sectional view of an alternative configuration of the hybrid module of FIG. 1.

The following description is made with reference to FIGS. 1-2. FIG. 1 is a top half cross-sectional view of hybrid module 100. FIG. 2 is a top half cross-sectional view of hybrid module 200. Hybrid module 200 is generally the same as hybrid module 100 with a larger torque converter. The description of hybrid module 100 generally applies to hybrid module 200. Hybrid module 100 for a vehicle (not shown) includes torque converter 102 and electric motor 104. The torque converter includes impeller shell 106 and cover 108. The cover is fixed to the impeller shell to form at least a portion of outer shell 110 for the torque converter. The electric motor includes rotor 112 supported on rotor carrier 114. The cover and the rotor carrier are integrally formed from a same piece of material.

Hybrid module 100 includes resolver rotor 116 fixed to the rotor carrier. Hybrid module 100 includes cover disk 118. The cover disk is fixed to the rotor carrier and extends radially inward to form a portion of the outer shell. Hybrid module 100 includes turbine shell 120, turbine hub 122, clutch plate 124 and clutch plate 126. The turbine shell is arranged with the impeller shell to form hydrodynamic coupling 128. That is, impeller shell 106 and turbine shell 120 include respective blades 130 and 132 that impart force on an operating fluid (i.e., transmission fluid) to drive the vehicle. The turbine hub is fixed to the turbine shell and includes axial tab 134. Clutch plate 124 is drivingly engaged with axial tab 134. The cover disk includes axial tab 136 and clutch plate 126 is drivingly engaged with axial tab 136. The turbine hub includes radial tab 138. Axial displacement of the turbine shell towards the cover disk is limited by the radial tab.

Hybrid module 100 includes piston 140 disposed on axial side 142 of the cover disk and piston 144 disposed on axial side 146, opposite axial side 142, of the cover disk. Each of piston 140 and piston 144 is rotationally fixed and axially displaceable relative to the cover disk by respective leaf springs 148 and 150, for example. Piston 140 is sealed directly to the cover disk by seal 152, for example.

Hybrid module 100 includes apply chamber 154 at least partially formed by piston 140 and the cover disk, and apply chamber 156 at least partially formed by piston 144 and the cover disk. Apply chamber 154 is arranged for hydraulic connection with apply channel 158 of input shaft 160 for vehicle transmission partially shown at 162. Hybrid module 100 includes module housing 164. The module housing includes radial wall 166 with flow channel 168. Flow channel 168 may be a tube inserted into a mold when housing 164 is cast, for example. Apply chamber 156 is hydraulically connected to flow channel 168. Hybrid module 100 includes engine shaft 170 with flow channel 172. Apply chamber 156 is hydraulically connected to flow channel 168 by flow channel 172.

Hybrid module 100 includes centering disk 174 and centering bearing 176. The centering disk is fixed to the rotor carrier and includes tubular protrusion 178. The module housing includes tubular protrusion 180. The centering bearing is disposed radially between tubular protrusion 178 and tubular protrusion 180 for radially positioning the rotor in the module housing. Module housing 164 includes outer housing 182 arranged for fixing to a vehicle combustion engine (partially shown at 184) at flange 186, for example, and a vehicle transmission (partially shown at 162) at flange 188, for example. The radial wall and the outer housing are integrally formed from a same piece of material. Hybrid module 100 includes deflector disk 190 fixed to the centering disk and extending radially inward. Deflector disk 190 is arranged to provide a balancing oil in balance chamber 192 to counter hydrodynamic effects from oil in chamber 156.

Figure 3:
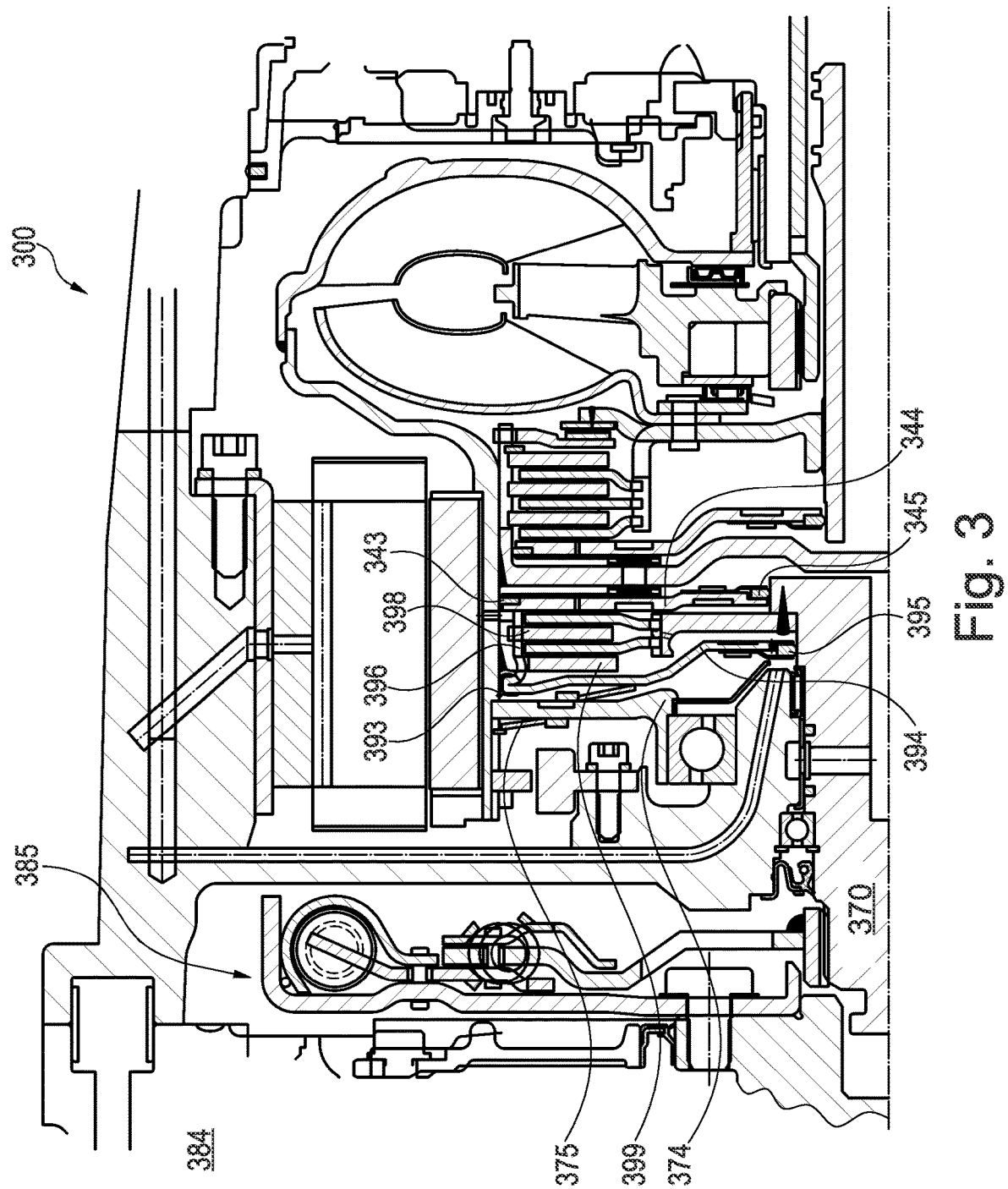
FIG. 3 is a top half cross-sectional view of an alternative configuration of the hybrid module of FIG. 1.

The following description is made with reference to FIG. 3. FIG. 3 is a top half cross-sectional view of hybrid module 300. The description for hybrid module 100 generally applies to hybrid module 300 except as described below. Hybrid module 300 includes centering disk 374, balance plate 394, and engine shaft 370. The centering disk rotationally fixed to the rotor carrier but may be axially displaceable (against spring 375, for example). The balance plate is disposed axially between the centering disk and piston 344. The engine shaft is arranged for driving engagement with a vehicle combustion engine (shown partially at 384) through engine damper 385, for example. The balance plate and piston 344 are each sealed to the rotor carrier and the engine shaft by respective seal pairs 393 and 395, and 343 and 345, for example. The balance plate includes axial protrusion 396 in contact with piston 344. Hybrid module 300 includes clutch plate 398. The axial protrusion is a tab and the clutch plate is drivingly engaged with the tab. Hybrid module 300 includes backing plate 399 fixed to the rotor carrier. The axial protrusion is a tab drivingly engaged with the backing plate.

Figure 4:
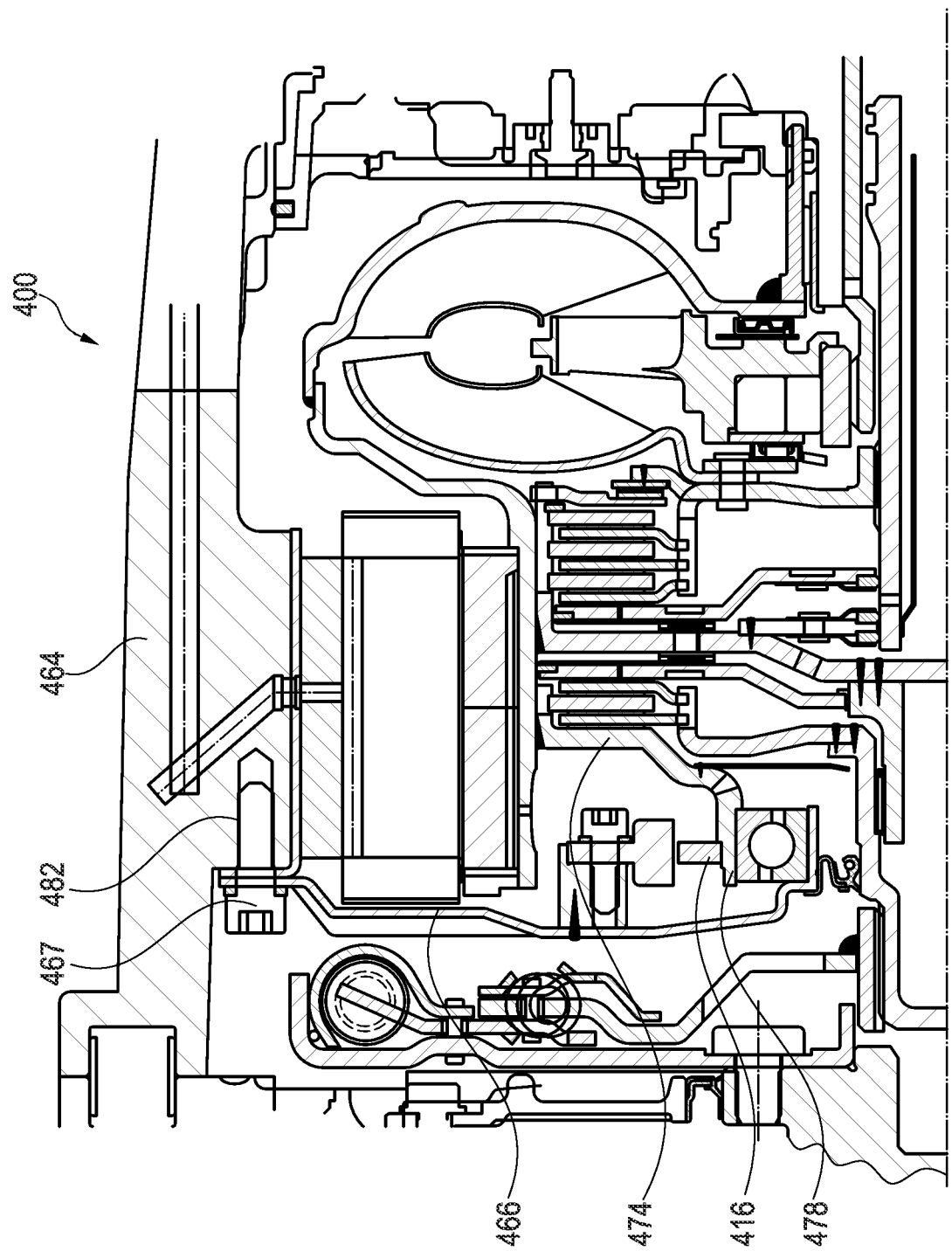
FIG. 4 is a top half cross-sectional view of an alternative configuration of the hybrid module of FIG. 1.

The following description is made with reference to FIG. 4. FIG. 4 is a top half cross-sectional view of hybrid module 400. The description for hybrid module 100 generally applies to hybrid module 400 except as described below. Hybrid module 400 includes resolver rotor 416 is fixed to tubular protrusion 478 of centering disk 474. Module housing 464 includes outer housing 482 arranged for fixing to a vehicle combustion engine and vehicle transmission as described for housing 182 above. Radial wall 466 is a sheet metal part fixed to the outer housing by bolts 467, for example.

Returning to FIG. 1, hybrid module 100 includes electric motor 104, torque converter 102, and K0 clutch 101. The electric motor includes rotor 112 and stator 113. The torque converter is fixed to the rotor. The torque converter includes hydrodynamic circuit, or hydrodynamic coupling, 128, and lockup clutch 103 for bypassing the hydrodynamic circuit. The K0 clutch is arranged for selectively connecting the torque converter to the combustion engine. Radially outer diameter 105 of the lockup clutch and the K0 clutch is less than radially inner diameter 107 of the rotor. Rotor 112 includes axial ends 109 and 111. The K0 clutch is entirely axially between ends 109 and 111. The lockup clutch is at least partially axially between axial ends 109 and 111.

Torque converter 102 includes radial wall, or cover disk, 118, disposed axially between the lockup clutch and the K0 clutch. The lockup clutch includes axially displaceable piston 140 that is rotationally fixed to the radial wall. The axially displaceable piston moves away from the radial wall to engage the lockup clutch. The K0 clutch includes axially displaceable piston 144 that is rotationally fixed to the radial wall. The axially displaceable piston moves away from the radial wall to engage the K0 clutch.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module
101 K0 clutch
102 Torque converter
103 Lockup clutch
104 Electric motor
105 Radially outer diameter (lockup and K0)
106 Impeller shell
107 Radially inner diameter (rotor)
108 Cover
109 Axial end (rotor, first)
110 Outer shell
111 Axial end (rotor, second)
112 Rotor
114 Rotor carrier
116 Resolver rotor
118 Cover disk
120 Turbine shell
122 Turbine hub
124 Clutch plate (first)
126 Clutch plate (second)
128 Hydrodynamic coupling
130 Blade (impeller shell)
132 Blade (turbine shell)
134 Axial tab (turbine hub)
136 Axial tab (cover disk)
138 Radial tab
140 Piston (first)
142 Axial side (first)
144 Piston (second)
146 Axial side (second)
148 Leaf spring (first piston)
150 Leaf spring (second piston)
152 Seal
154 Apply chamber (first)
156 Apply chamber (second)
158 Apply channel (input shaft)
160 Input shaft
162 Vehicle transmission (partial)
164 Module housing
166 Radial wall
168 Flow channel (first)
170 Engine shaft
172 Flow channel (second)
174 Centering disk
176 Centering bearing
178 Tubular protrusion (centering disk)
180 Tubular protrusion (module housing)
182 Outer housing
184 Vehicle combustion engine (partial)
186 Flange (engine side)
188 Flange (transmission side)
190 Deflector disk
192 Balance chamber
200 Hybrid module
300 Hybrid module
343 Seal (piston)
344 Piston (second)
345 Seal (piston)
370 Engine shaft
374 Centering disk
375 Spring
384 Vehicle combustion engine (partial)
385 Engine damper
393 Seal (balance plate)
394 Balance plate
395 Seal (balance plate)
396 Axial protrusion (balance plate)
398 Clutch plate
399 Backing plate
400 Hybrid module
416 Resolver rotor
464 Module housing
466 Radial wall
467 Bolts
474 Centering disk
478 Tubular protrusion
482 Outer housing

What is claimed is:

1. A hybrid module for a vehicle, comprising:
   a rotational axis;
   a torque converter comprising:
   an impeller shell; and,
   a cover, fixed to the impeller shell to form at least a portion of an outer shell for the torque converter;
   an electric motor comprising a rotor supported on a rotor carrier, wherein the cover and the rotor carrier are integrally formed from a same piece of material; and,
   a cover disk, fixed to the rotor carrier and extending radially inward to the rotational axis to form a portion of the outer shell.

2. The hybrid module of claim 1 further comprising:
   a turbine shell arranged with the impeller shell to form a hydrodynamic coupling;
   a turbine hub, fixed to the turbine shell and including a first axial tab;
   a first clutch plate drivingly engaged with the first axial tab; and,
   a second clutch plate, wherein:
   the cover disk comprises a second axial tab; and,
   the second clutch plate is drivingly engaged with the second axial tab.

3. The hybrid module of claim 1 further comprising:
   a first piston disposed on a first axial side of the cover disk; and,
   a second piston disposed on a second axial side, opposite the first axial side, of the cover disk, wherein each of the first piston and the second piston is rotationally fixed and axially displaceable relative to the cover disk.

4. The hybrid module of claim 3 further comprising:
   a first apply chamber at least partially formed by the first piston and the cover disk; and,
   a second apply chamber at least partially formed by the second piston and the cover disk.

5. The hybrid module of claim 4 wherein the first apply chamber is arranged for hydraulic connection with an apply channel of an input shaft for a vehicle transmission.

6. The hybrid module of claim 4 further comprising a module housing, wherein:
   the module housing comprises a radial wall with a first flow channel; and,
   the second apply chamber is hydraulically connected to the first flow channel.

7. The hybrid module of claim 6 further comprising an engine shaft with a second flow channel, wherein the second apply chamber is hydraulically connected to the first flow channel by the second flow channel.

8. The hybrid module of claim 3 further comprising:
   a centering disk rotationally fixed to the rotor carrier;
   a balance plate disposed axially between the centering disk and the second piston; and,
   an engine shaft arranged for driving engagement with a vehicle combustion engine, wherein the balance plate and the second piston are each sealed to the rotor carrier and the engine shaft.

9. The hybrid module of claim 8 wherein the balance plate includes an axial protrusion in contact with the second piston.

10. The hybrid module of claim 9 further comprising a clutch plate, wherein the axial protrusion is a tab and the clutch plate is drivingly engaged with the tab.

11. The hybrid module of claim 9 further comprising a backing plate fixed to the rotor carrier, wherein the axial protrusion is a tab drivingly engaged with the backing plate.

12. The hybrid module of claim 1 further comprising:
    a centering disk fixed to the rotor carrier and comprising a first tubular protrusion;
    a module housing comprising a radial wall and a second tubular protrusion; and,
    a centering bearing disposed radially between the first tubular protrusion and the second tubular protrusion for radially positioning the rotor in the module housing.

13. The hybrid module of claim 12 wherein:
    the module housing comprises an outer housing arranged for fixing to a vehicle combustion engine and vehicle transmission; and,
    the radial wall and the outer housing are integrally formed from a same piece of material; or,
    the radial wall is a sheet metal part fixed to the outer housing.

14. A hybrid module for a vehicle, comprising:
    a module housing, comprising a radial wall with a first flow channel;
    an engine shaft, comprising a second flow channel a torque converter, comprising:
    an impeller shell; and,
    a cover, fixed to the impeller shell to form at least a portion of an outer shell for the torque converter;
    an electric motor, comprising a rotor supported on a rotor carrier formed integrally from a same piece of material as the cover;
    a cover disk, fixed to the rotor carrier and forming a portion of the outer shell;
    a first piston, disposed on a first axial side of the cover disk;
    a first apply chamber, at least partially formed by the first piston and the cover disk;
    a second piston, disposed on a second axial side, opposite the first axial side, of the cover disk; and,
    a second apply chamber, at least partially formed by the second piston and the cover disk, hydraulically connected to the first flow channel by the second flow channel.

15. A hybrid module for a vehicle, comprising:
    a torque converter, comprising:
    an impeller shell; and,
    a cover, fixed to the impeller shell to form at least a portion of an outer shell for the torque converter;
    an electric motor, comprising a rotor supported on a rotor carrier formed integrally from a same piece of material as the cover;
    a cover disk, fixed to the rotor carrier and forming a portion of the outer shell;
    a first piston, disposed on a first axial side of the cover disk;
    a second piston, disposed on a second axial side, opposite the first axial side, of the cover disk;
    a centering disk, rotationally fixed to the rotor carrier;
    a balance plate, disposed axially between the centering disk and the second piston; and,
    an engine shaft, arranged for driving engagement with a vehicle combustion engine, wherein the balance plate and the second piston are each sealed to the rotor carrier and the engine shaft.

16. The hybrid module of claim 15 wherein the balance plate includes an axial protrusion in contact with the second piston.

17. The hybrid module of claim 16 further comprising a clutch plate, wherein the axial protrusion is a tab and the clutch plate is drivingly engaged with the tab.

18. The hybrid module of claim 16 further comprising a backing plate fixed to the rotor carrier, wherein the axial protrusion is a tab drivingly engaged with the backing plate.

\* \* \* \* \*